INVENTOR.
THOMAS L. GILTINAN

INVENTOR.
THOMAS L. GILTINAN

United States Patent Office 3,452,208
Patented June 24, 1969

3,452,208
AUTOMATIC LIQUID LEVEL DETECTOR, USING REFLECTION FROM THE MENISCUS
Thomas L. Giltinan, Tullahoma, Tenn., assignor to the United States of America as represented by the Secretary of the Air Force
Substitute for abandoned application Ser. No. 223,083, Sept. 12, 1962. This application Mar. 29, 1966, Ser. No. 551,819
Int. Cl. G01n 21/26
U.S. Cl. 250—218  1 Claim

ABSTRACT OF THE DISCLOSURE

A detecting device designed to have a carrier on a manometer tube located always at the meniscus. A bridge circuit is balanced by matching two photoelectric cells, imbalance in the circuit operates to move the carrier up or down until it reaches meniscus level. A current is set up in the bridge circuit to operate a motor to move the carrier up or down depending on which photoelectric cell is in dominance. The at rest position or balanced condition in the circuit is brought about by a diminished beam involving both refraction of a beam and reflection of a portion of it from the under surface of the meniscus at liquid level.

---

The present invention relates to a liquid level detector, and more particularly to a device capable of automatic movement with respect to a transparent manometer tube or like device, and governed by a balanced photoelectric system for detecting liquid levels.

The object of the invention is the provision of a device for detection of column height in such devices as servomanometers and the like.

A further object of the invention is the provision of a photoelectrically sensitive device for causing its own motion with respect to a manometer tube or like device for the detection of the liquid level therein.

A further object is the provision of a scanner having detecting means automatically movable upward until the liqiud level in the tube is reached or downward until the liquid level is reached, and means for maintaining the scanner stationary at the fluid level.

A further object of the invention is the provision of a scanner, self-moving in the direction of the liquid level when positioned either above or below the liquid level and brought to rest only at the meniscus of the liquid level.

A further object of the device is the provision of a balanced means for moving a scanner in either direction toward the liquid level in a manometer tube and bringing the scanner to rest when the liquid level is reached.

A further object of the invention is the construction of a device wherein the meniscus at the liquid level in a manometer tube serves as a means for detecting this liquid level.

A further object of the invention is the provision of a system for accomplishing the above noted purposes which will work properly when inverted.

A further object of the invention is the provision of a system wherein the impact of a ray of light on a photoelectric cell is diminished and a light sensitive system is brought into balance by the elimination of a portion of a ray which meets the meniscus surface of a liquid and is reflected.

A further object of the invention is the provision of a liquid level detecting device capable of a higher degree of accuracy and speed than has been attainable with present equipment.

A still further object of the invention is the provision of a device as above noted which can be used with manometer tubes containing transparent, semi-transparent or translucent liquids, and which is capable of modification, by inversion of the moving element, to accommodate opaque liquids.

These and other advantages, features and objects of the invention will become more apparent from the following description taken in connection with the illustrative embodiments in the accompanying drawings, wherein.

Figure 4:
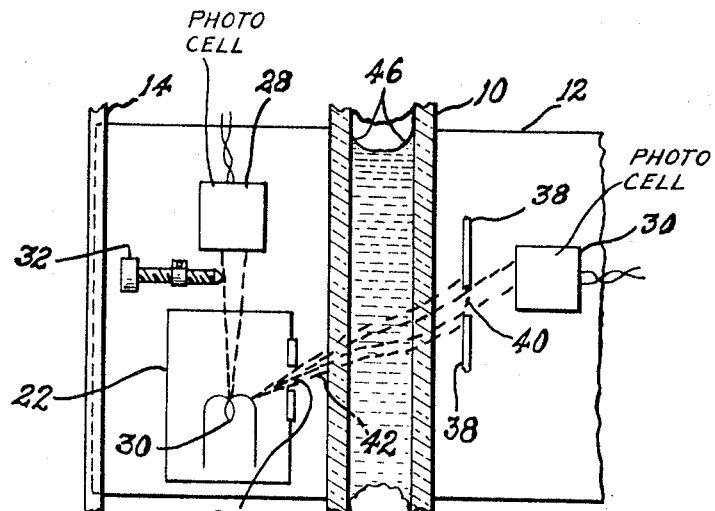
FIG. 4 is an elevational view of the device in the drive-up position.

Referring more in detail to the drawings, a manometer tube 10 is connected to a liquid supply source (not shown). As is standard, the function of the manometer tube is revealing the level of a liquid in a tank or other fluid container. The elements of the scanning device are attached to a board or carrier 12 or other supporting structure, which is mounted for vertical movement in any suitable manner, such as a stationary channel member 14 for slidably receiving the edge portion of the board 12. The board 12 is propelled upward or downward by a motor 16, through any expedient intermediary, such as the rack and pinion device 18, shown in FIG. 1. The motor 16 is activated by power from a bridge circuit balanced by a system of photoelectric cells, later described, to control the board: (1) to move in an upward direction if a pencil beam of light from a light source, beamed through the manometer tube, is completely intercepted and refracted by a liquid within the tube (FIG. 4); (2) to move in a down direction when the beam penetrates the tube above the liquid level (FIG. 1); and (3) to be at rest when the light beamed through the tube is reduced by elimination of a portion of the beam reflected by the undersurface of the meniscus at liquid level.

Figure 3:
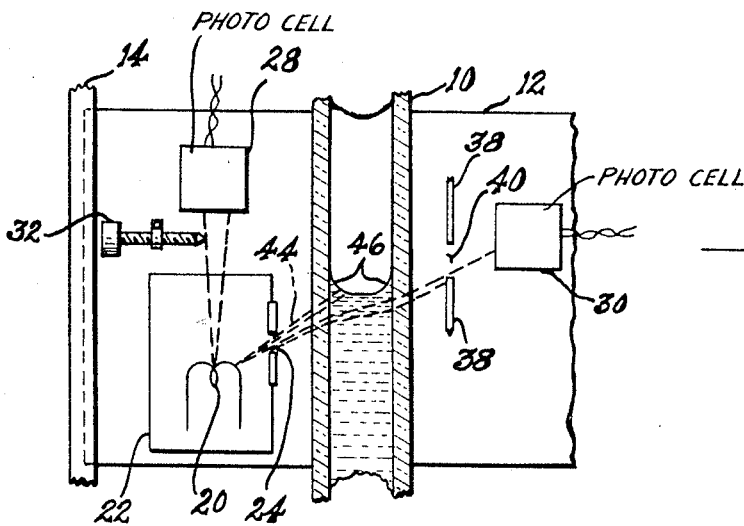
FIG. 3 is an elevational schematic showing of the device in the at rest position.
Figure 2:
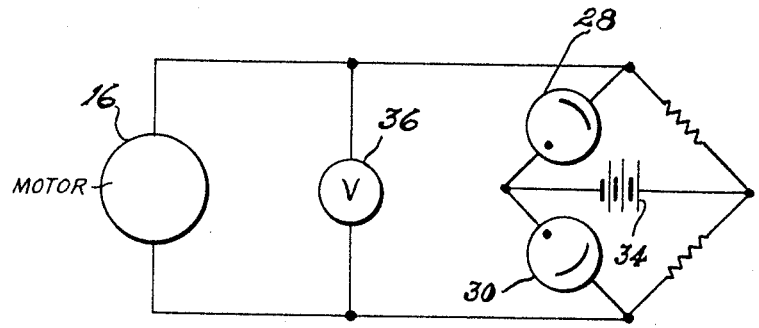
FIG. 2 is a diagram showing the electrical wiring system of the balancing mechanism, with two controlling photoelectric cells in a balanced bridge circuit.

A light source 20 is attached to the board 12, moving with it. The light source 20 is shielded by a shield 22 having a slit or comparable opening 24 and an open top. The slit 24 is located in such a position that a beam passing through it strikes and enters the transparent tube 10. Two photoelectric cells 28 and 30 secured to the board 12 and located on opposite sides of the tube, receive light from the light source 20. The amount of light which the cell 28 receives from the light source 20 is predetermined and establishes a balance point or a point where the signal strengths of the photoelectric cells 28 and 30 cancel each other out. Any effective adjusting device may be used, such as an adjustable driver shield 32. The cells 28 and 30 (see FIG. 2), form part of a standard balanced bridge circuit, wherein current is supplied by a battery or other power source 34. The motor 16, as will now be evident, will be driven in either direction, to move the scanner up, or move it down, or allow it to remain at rest, depending upon the balance of the quantities of light effecting the two photoelectric cells 28 and 30. When the same amount of light enters each cell, the signals from each cell cancel each other out and no current flows in the circuit. When this condition prevails, motor 16 is at rest and the voltmeter 36 registers zero (FIG. 3). When either photoelectric cell sends a stronger signal than the other, and a current is generated in the motor circuit, the voltmeter will register a quantity above or below zero, depending upon which cell is receiving the strongest beam, and thereby indicating whether the scanner 10 is above or below the liquid level in the manometer tube, and indicating also the direction of travel of the scanner board 12.

To effect this sensitive balance, a shield 38 having a slit 40 is positioned between the photoelectric cell and the tube 10, in such position as to admit or intercept the beam 42 depending upon the angle of its reception.

Figure 1:
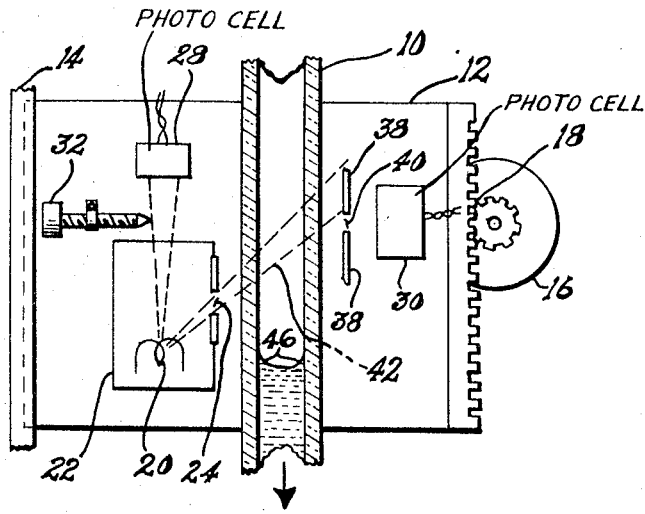
FIG. 1 is an elevational schematic showing of the device in the drive-down position.

In the position shown in FIG. 1, the level of the liquid is below the slit 24, so that the beam 42 passes through the tube undeflected by the fluid therein, and strikes the shield 38 in the area above the slit 40. The photoelectric cell 30 receives no light, and the current supplied to the motor 16 will be governed by the cell 28 alone, and in a direction to drive the scanning board down.

In the position shown in FIG. 4, the beam 42 passes into the tube and receives maximum deflection by the fluid in the tube, distributing the rays on both sides of the slit 40, so that the cell 30 receives a maximum quantity of light. In this condition, and as long as maximum rays are received by the cell 30, the balance of the system is such that the cell 30 gives a stronger signal than the cell 28. The current in the circuit is now in a direction to move the board up.

When the slit 24 reaches the position shown in FIG. 3, a portion of the rays indicated at 44 reach the meniscus 46 at liquid level and are reflected back from the underside of the liquid surface of the meniscus. The remainder of the beam passes through the fluid in the tube in refracted condition (FIG. 3), passes through the slit 40 to enter the cell 30. The quantity of light, however, has been sufficiently reduced by the reflection of part of it, and now equals the predetermined quantity of light entering the photoelectric cell 28. The signal strengths of the two cells are now equal and cancel each other out. There is no current through the motor circuit to run the motor in either direction, the scanner board will remain at rest, and the voltmeter 36 will register zero.

For purposes of illustration, the angle of deflection of the beam within the tube is shown greatly exaggerated. The actual angle in practice is of the order of one or two degrees. The device will also work properly if the whole assembly is inverted.

What I claim is:

1. An automatic liquid level detector comprising a fixed manometer tube, a carrier movable vertically with respect to said tube, a single motor for moving said carrier upward and downward along said tube, a balanced bridge circuit for operating said motor and moving said carrier upward and downward when in a state of imbalance, and for maintaining said carrier at rest when in a balanced condition, a first photoelectric cell and a second photoelectric cell in said bridge circuit, both of said cells being mounted on said carrier, movable with it and opposite each other with respect to said manometer tube, said first photoelectric cell operating in said circuit as an adjustable standard; a light source mounted on said carrier, rays from said light source having access directly to said first photoelectric cell, a shield for said light source, said shield provided with a slit for allowing access of rays from said light source to said second photoelectric cell and only through said manometer tube; a shield for said second photoelectric cell, said shield having a slit for allowing entrance of selected beams to said second photoelectric cell; said carrier being moved upward when imbalance is acquired in the system by the dominance of one photoelectric cell, and downward when imbalance is acquired in the system by the dominance of the other photoelectric cell, the carrier coming to rest only when balance is acquired in the system and each photoelectric cell encounters the same amount of light; a condition acquired in the system only by a diminished ray, said ray being diminished by refraction of a portion of said beam by its passage through the liquid in said manometer tube, the second photoelectric cell encountering only a part of the refracted light; and the complete removal of a portion of said beam by reflection from the under surface of the meniscus occurring at liquid level.

References Cited

UNITED STATES PATENTS

| | | | |
|---|---|---|---|
| 1,737,126 | 11/1929 | Reyling et al. | 250—218 X |
| 1,955,315 | 4/1934 | Styer | 250—218 X |
| 2,376,459 | 5/1945 | Stevens | 250—218 X |
| 2,817,237 | 12/1957 | Stevens | 250—218 X |
| 2,980,802 | 4/1961 | Bracey et al. | 250—218 |
| 3,233,781 | 2/1966 | Grubbs | 250—218 X |

RALPH G. NILSON, *Primary Examiner.*

M. A. LEAVITT, *Assistant Examiner.*

U.S. Cl. X.R.

73—290